United States Patent [19]

Fukui

[11] 4,260,997
[45] Apr. 7, 1981

[54] RECORDING DEVICE

[75] Inventor: Takashi Fukui, Minami-ashigara, Japan

[73] Assignee: Fuji Photo Film Co., Ltd., Kanagawa, Japan

[21] Appl. No.: 100,108

[22] Filed: Dec. 4, 1979

[30] Foreign Application Priority Data

Dec. 23, 1978 [JP] Japan .................. 53-162422

[51] Int. Cl.³ .............. G01D 9/42; G01D 15/24; H04N 1/06; B41B 13/00
[52] U.S. Cl. .................. 346/108; 346/138; 358/290; 354/5
[58] Field of Search ............ 346/108, 138; 358/290; 354/5, 63, 110

[56] References Cited

U.S. PATENT DOCUMENTS

| 2,532,799 | 12/1950 | Young ................. 346/108 UX |
| 3,707,723 | 12/1972 | Levene ................ 346/108 |
| 3,823,276 | 4/1974 | Maslowski et al. ........ 358/290 X |

FOREIGN PATENT DOCUMENTS 326937 3/1930 United Kingdom ............. 358/290

Primary Examiner—George H. Miller, Jr.

Attorney, Agent, or Firm—Harold L. Stults; Pasquale A. Razzano

[57] ABSTRACT

A recording laser beam is modulated by an acousto-optic modulator with input image signals. The modulated laser beam expanded by a lens system impinges upon a light beam deflector. The light beam deflector includes a plurality of mirror surfaces in the form of a polygonal pyramid. A plurality of photosensitive recording media are supported on the inner surface of a cylindrical support member. The light beam deflector is located within the cylindrical support member for rotation about and sliding movement along the longitudinal axis of the cylindrical support member. The modulated and expanded laser beam impinges upon the light beam deflector at the apex of the polygonal pyramid at an angle parallel to the axis of the pyramid and divided into a plurality of light beams outwardly reflected by the mirror surfaces in a plurality of radial directions. The reflected light beams are focussed on the respective photosensitive recording media on the inner surface of the cylindrical support member. The reflected light beams are caused to scan the plurality of photosensitive recording media by rotating the light beam deflector and by axially moving the light beam deflector. Thus, the input image signals are simultaneously recorded on a plurality of photosensitive recording media.

6 Claims, 4 Drawing Figures

RECORDING DEVICE

BACKGROUND OF THE INVENTION

1. Field of the Invention

This invention relates to a recording device capable of making a plurality of hard copies of an image from the same input image signals. The recording device of this invention is particularly useful for a newspaper office to record image signals received by a facsimile receiver on a plurality of photosensitive presensitized printing plate materials by use of a recording scanning light beam modulated with the image signals.

2. Description of the Prior Art

Conventionally, a plurality of printing plates bearing an image carried by image signals received by a facsimile receiver has been prepared by first recording the received signals on a reflection type photosensitive recording material, photographically transferring the image recorded thereon to a lith (lithographic) film, and finally repeatedly printing the lith film onto a plurality of printing plate materials, or by directly recording the received signals on a lith film and repeatedly printing the lith film onto a plurality of printing plate materials.

However, the conventional methods of preparing a plurality of printing plates are time consuming and therefore are not suitable particularly for a newspaper office which is required to report news as quickly as possible.

Recently, there has been developed a recording system in which the image signals received by a facsimile receiver are directly recorded on a presensitized plate by modulating a laser beam with the image signals, such as "Laserite" of EOCOM Corp. in U.S.A. However, the recording device is not suitable for making a plurality of printing plates simultaneously from the same input image signals.

SUMMARY OF THE INVENTION

In light of the foregoing observations and description, the primary object of the present invention is to provide a recording device which is capable of making a plurality of hard copies or printing plates simultaneously from the same input image signals.

In accordance with the present invention, a recording light beam is modulated with input image signals and the modulated light beam is divided into a plurality of light beams by means of a plurality of mirror surfaces which define inclined surfaces of a polygonal pyramid. The divided light beams are focussed on a plurality of photosensitive recording media disposed around the mirror surfaces. The photosensitive recording media are supported side by side on the inner surface of a cylindrical support member. The central axis of the polygonal pyramid is in coincident with the longitudinal axis of the cylindrical support member and the mirror surfaces are rotatably and slidably mounted for rotation about and for sliding movement along the axis with respect to the support member. Thus, the divided light beams are caused to scan the corresponding photosensitive recording media by rotating and sliding the mirror surfaces with respect to the support member. Thus, the input image signals are simultaneously recorded on a plurality of photosensitive recording media or presensitized plates. The input image signals may be image signals received by a facsimile receiver, image signals of a television system or the like.

DESCRIPTION OF THE PREFERRED EMBODIMENT

Figure 1:
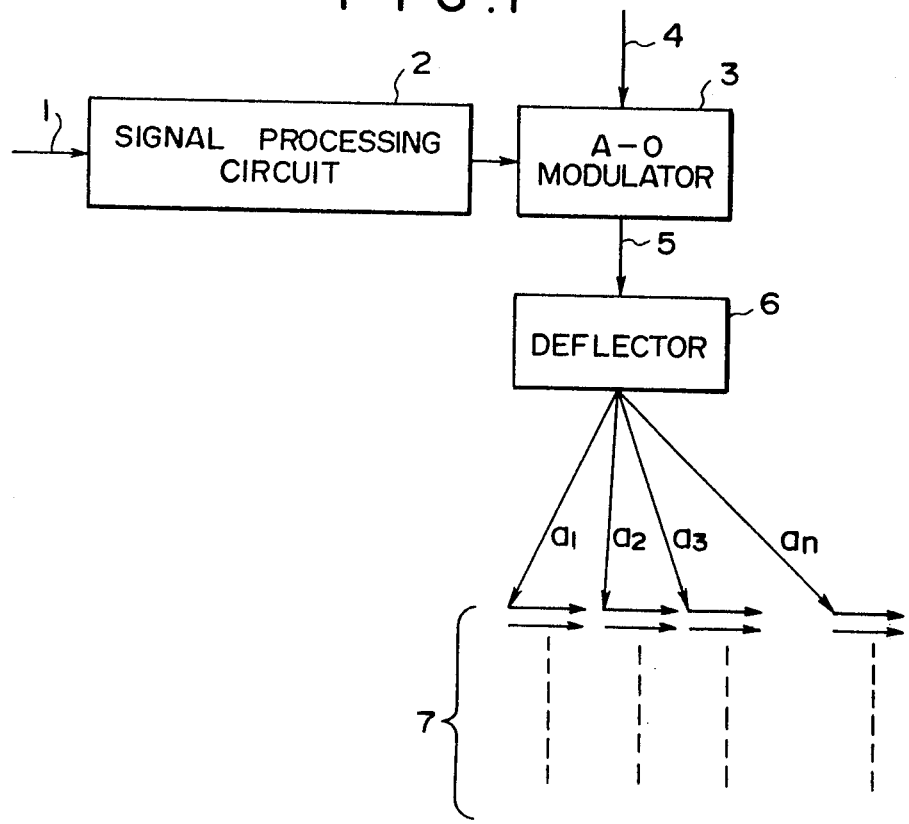
FIG. 1 is a block diagram schematically illustrating the principle of the present invention.

Referring to FIG. 1, input image signals 1 are supplied to an acousto-optic modulator 3 by way of a signal processing circuit 2 which may comprise a circuit for Y correction or a circuit for improving image sharpness. The acousto-optic modulator 3 modulates a recording light beam 4 with the image signals 1. The modulated light beam 5 is divided into a plurality of light beams a1 to an by means of a special light deflector means 6, and the divided light beams a1 to an are caused to scan a plurality of photosensitive recording media 7, simultaneously. Thus, the input image signals 1 are simultaneously recorded on all the photosensitive recording media 7 whereby a plurality of hard copies are made from the same input signals. The special light deflector means 6 serves to divide the modulated light beams 5 into a plurality of light beams a1 to an, sweep the divided light beams across the respective photosensitive recording media 7 and step the divided light beams by one pitch each time scan of one scanning line across the photosensitive recording media 7 is completed. The input image signals 1 may be once stored in a memory system such as a scan converter which reads out the stored image signals and transmits them to the acousto-optic modulator 3.

Figure 2:
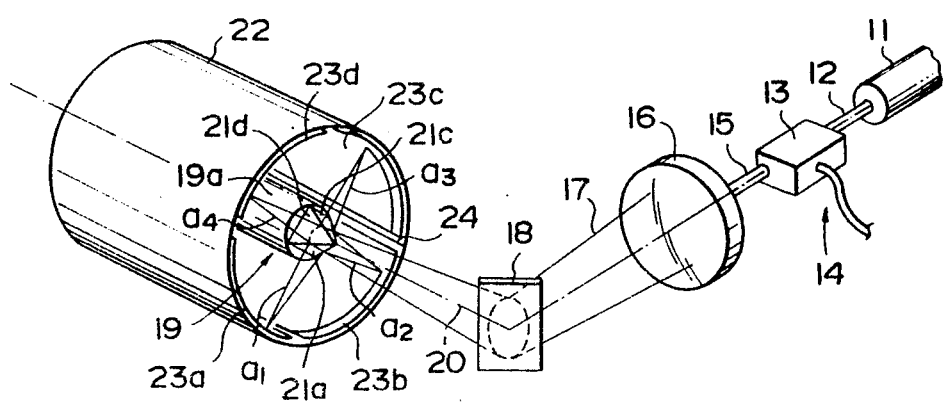
FIG. 2 is a perspective view schematically showing a recording device in accordance with an embodiment of the present invention.
Figure 3:
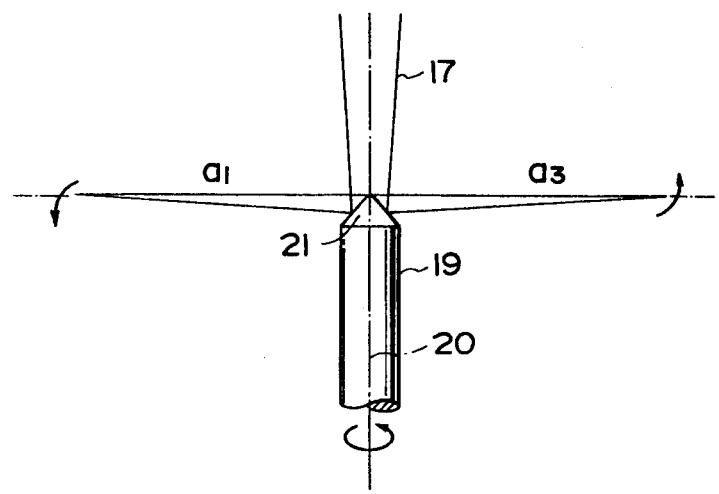
FIG. 3 is an enlarged view of a part of the deflector employed in the recording device shown in FIG. 2.

FIG. 2 schematically shows a recording device in accordance with an embodiment of the present invention. The recording device of this embodiment makes four hard copies simultaneously.

A recording laser beam 12 emitted from a laser source 11 is modulated by an acousto-optic modulator 13 with image signals 14 inputted thereinto. The modulated laser beam 15 is transmitted through a lens system 16 and reflected by a mirror 18 to impinge upon a deflector means 19. Four photosensitive recording media 23a to 23d are supported on the inner surface of a cylindrical supported member 22 at equal angular intervals. The deflector means 19 comprises a rotating shaft 19a and four mirror surfaces 21a to 21d provided on an end face thereof. The mirror surfaces 21a to 21d define inclined surfaces of a rectangular pyramid the central axis of which is in coincident with the longitudinal axis 20 of the rotating shaft 19a. The mirror surfaces 21a to 21d are inclined at 45° with respect to the axis 20. The cylindrical support member 22 is disposed coaxially with the rotating shaft 19a and the deflector means 19 is slidable along and rotatable about the axis 20 with respect to the cylindrical support member 22.

The lens system 16 expands the diameter of the modulated laser beam 15 as indicated by 17. The expanded laser beam 17 is reflected by the mirror 18 and travels along the axis 20 to impinge upon the mirror surfaces 21a to 21d at an area including the apex thereof. Each of the mirror surfaces reflects the corresponding part of the expanded laser beam 17 in a direction perpendicular to the axis 20. The expanded laser beam 17 is thus divided into four light beams a1 to a4 and focussed on the respective photosensitive recording media 23a to 23d. Each of the divided light beams a1 to a4 carries the image signals since the expanded laser beam 17 has been modulated in accordance with the image signals. When the mirror surfaces 21a to 21d are rotated about the axis 20 together with the rotating shaft 19a, the divided light beams a1 to a4 scan the corresponding photosensitive recording media 23a to 23d to record the image signals thereon.

When the rotating shaft 19a makes a quarter revolution and the light beam a1 impinges upon a reference mark 24 provided between the first and second photosensitive recording media 23a and 23b, a clock detector (not shown) generates a signal to cause the rotating shaft to return to its original angular position and to slide with respect to the cylindrical support member 22 to step the light beams a1 to a4 by one pitch. At the same time a part of the input image signals corresponding to another scan line is sent to the acousto-optic modulator 13. Thus, all the input image signals are simultaneously recorded on all the photosensitive recording media 23a to 23d.

Figure 4:
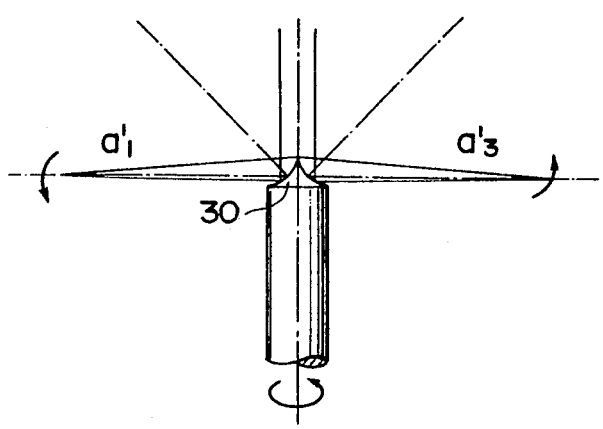
FIG. 4 shows another example of the deflector.

The deflector means 19 may comprise spherical concave mirror surfaces 30 as shown in FIG. 4. In this case, the modulated light beam impinging upon the mirror surfaces 30 may not be a converging light beam but can be a collimated light beam. When the light beam is collimated, the light beams reflected by the spherical concave mirror surfaces 30 are focussed on the focal plane of the concave mirror surfaces. Accordingly, the focal length of the mirror surfaces is selected to be equal to the radius of the cylindrical support member 22 so that the light beams a'1 to a'4 are focussed on the photosensitive recording media 23a to 23d.

The concave mirror surfaces of the deflector means may be non-spherical rather than spherical in view of the efficiency in concentrating the light beam on the surface of the photosensitive recording media and the possible distortion of the image.

I claim:

1. A recording device for simultaneously recording input image signals on a plurality of photosensitive recording media comprising a substantially cylindrical support member on the inner surface of which the photosensitive recording media are supported, a plurality of mirror surfaces in the form of inclined surfaces of a polygonal pyramid provided within the support member, an acousto-optic modulator for modulating a recording light beam with the input image signals, and a means for guiding the modulated light beam along the longitudinal axis of the cylindrical support member, the central axis of the polygonal pyramid being in coincidence with the longitudinal axis of the cylindrical support member, the mirror surfaces being rotatable about the longitudinal axis of the cylindrical support member with respect thereto, the modulated light beam impinging upon the mirror surfaces at an area including the apex thereof travelling along the longitudinal axis of the cylindrical support member, the mirror surfaces reflecting the corresponding parts of the modulated light beam in different direction dividing the modulated light beam into a plurality of light beams, the divided light beams being focussed on the respective photosensitive recording media scanning the same by rotation about and sliding movement along the longitudinal axis of the cylindrical support member of the mirror surfaces thereby recording the input image signals on the photosensitive recording media.

2. A recording device as defined in claim 1 in which said mirror surfaces are plane mirror which are inclined with respect to the longitudinal axis of the support member by a predetermined angle.

3. A recording device as defined in claim 1 in which the mirror surfaces are concave mirrors and the modulated light beam is focussed on the surface of the photosensitive recording medium thereby.

4. A recording device as defined in claim 3 in which said concave mirrors are spherical concave mirrors.

5. A recording device as defined in claim 3 in which said concave mirrors are non-spherical mirrors.

6. A recording device as defined any one of in claims 3 to 5 in which the modulated light beam is collimated prior to impinging upon the concave mirrors.

* * * * *